INVENTOR.
JOSEPH J. MURRAY JR.
BY Walter J. Jagmin
ATTORNEY

INVENTOR.
JOSEPH J. MURRAY JR.
BY Walter J Jagmin
ATTORNEY

Patented Feb. 10, 1953

2,628,343

UNITED STATES PATENT OFFICE 2,628,343

MECHANICAL VIBRATING DEVICE

Joseph J. Murray, Jr., Garland, Tex., assignor to Varo Mfg. Co., Inc., Garland, Tex., a corporation of Texas Application February 11, 1950, Serial No. 143,661

5 Claims. (Cl. 340—16)

This invention relates to mechanical vibrating devices and more particularly to mechanical vibrating devices having a substantially constant frequency of vibration.

In many applications, mechanical vibrating devices such as tuning forks, are employed to generate an alternating current of substantially constant frequency and are usually driven by electromagnetic means. The alternating current is generated in pickup coils by variations in the flux of the magnetic field in which the pick-up coils are disposed caused by vibration of the tines of the tuning fork. Since both the driving means and the pick-up coils are generally wound about permanent magnets, the tuning fork is always subjected to the influences of magnetic fields.

It has been observed that a tuning fork whose tines are vibrating under the influence of a magnetic force whose component in the direction of motion of the tines is not constant with tine displacement will undergo a change in its natural period of vibration that will be directly proportional to the magnetic force gradient parallel to the direction of vibration of the tines. Furthermore, unless the magnetic force gradient is linear, the time-displacement relation of the fork tines will not be of sine form as for simple harmonic motion but will be distorted in proportion to the non-linearity of the force gradient.

The frequency of tuning forks also changes with variations in the temperature of the tuning fork and its associated permanent magnets. The main causes of the variations of the frequency of vibration with temperature are the changes in the dimensions and modulus of elasticity of the tines of the fork, and changes in the strength of the magnetic fields of the permanent magnets which change the magnetic force gradient parallel to the direction of vibration of the tines. Since the strength of permanent magnets varies inversely with temperature, the effect of an increase in temperature is to weaken the magnetic force gradient and to cause the tuning fork to vibrate at a different frequency. The changes in the frequency of vibration of the tuning fork due to changes in temperature depend on the physical properties of the elastic material of which the tuning fork is made. In the case of some materials the frequency of the tuning fork varies directly as the temperature. In the case of other materials the frequency varies inversely as the temperature.

In some applications, very small tuning forks are employed in order to reduce the heat capacity of the fork to reduce the time necessary to bring the temperature of the fork to the value at which the fork was designed to operate, and in order to minimize weight and space requirements of the tuning fork installation. Due to their small size, these tuning forks must be driven at the largest practicable amplitude of vibration to obtain alternating current of the required magnitude and the permanent magnets employed must be of relatively high strength. The relatively strong magnetic fields of the permanent magnet result in a large magnetic force gradient through which the tines vibrate causing relatively large change in the natural frequency of vibration of the forks.

It has been the practice to mount the tuning fork and its associated driving and pick-up means in an oven and to maintain the temperature of the tuning fork constant by thermostatic controls provided for the oven in order to minimize variations in the frequency of vibration due to changes in temperature. It is necessary to maintain the temperature in the oven equal to or above the highest temperature in which the tuning fork installation is to operate since the temperature of the tuning fork can be maintained constant only if the outside temperature is equal to or is less than the temperature maintained in the oven. Fairly close control of the frequency can be attained by the use of an oven but an appreciable time lag occurs between the initiation of operation and the time the tuning fork and its associated driving and pick-up means reach the operating temperature even though the heat capacity of the small fork is relatively very small. Until the operating temperature is attained, the fork will not vibrate at the proper frequency. In addition the thermostatic controls of the oven allow the temperature within the oven to cycle over a definite range of temperature. The thermostatic controls allow the temperature within the oven to be raised to the definite high value and then cut off the supply of heat to the oven. Thereafter the temperature must fall to a definite low value before the thermostatic controls allow more heat to be supplied to the oven. The temperature within the oven therefore cycles between the high and low values and the frequency of vibration of the tuning fork within the oven varies cyclically in accordance with the temperature.

I have discovered that the frequency of vibration of the tuning fork can be regulated by varying the magnetic force gradients of the magnetic fields set up by the driving and pick-up means which are parallel to the direction of vibration of the tines of the tuning fork. The magnetic force gradient may be varied by moving a body of magnetic material relative to the permanent magnets of the driving and pick-up means and to the tines of the tuning fork.

If the body of magnetic material is a permanent magnet, the permanent magnet also sets up a magnetic field which has a magnetic force gradient parallel to the direction of vibration of the tines of the fork. The regulating magnet is of such polarity and is so disposed in relation to the tines of the tuning fork that the magnetic force gradient it produces varies in the opposite direction from the magnetic force gradients of the driving and pick-up permanent magnets. By varying the distance of the regulating magnet from the permanent magnets the resultant magnetic gradient parallel to the direction of vibration of the tines may be varied to change the frequency of vibration of the tines.

The regulating magnet may be mounted adjacent the tines and the driving and pick-up magnets by means permitting adjustment of the distance between the tines and the regulating magnet to permit adjustment of the frequency of vibration of the tuning fork to a predetermined value. The regulating magnet may also be mounted on an element which will vary the distance in accordance with the temperature in order to maintain the frequency of vibration constant with change of temperature.

The body of magnetic material may also be employed as a magnetic shunt, in which event it is not a permanent magnet, to vary the strength of the magnetic fields in the direction parallel to the direction in which the tines vibrate. The magnetic shunt diverts a portion of the magnetic flux of the permanent magnets of the driving and pick-up means away from the tines of the fork and in this manner lessens the magnetic force gradient. The amount of magnetic flux diverted and the resulting degree of change in the magnetic force gradient can be varied by changing the position of the magnetic shunt relative to the permanent magnets. Since the magnetic force gradient can be varied the frequency of vibration of the tuning fork can also be varied. The use of the magnetic shunt also results in effective decoupling of the fork from the permanent magnets of the driving and pick-up means so that the amplitude, as well as the frequency, of vibration is affected by changes in the position of the magnetic shunt relative to the permanent magnet. Therefore, the magnetic shunt may also be employed as an amplitude regulating means.

Accordingly, it is an object of my invention to provide a new and improved mechanical vibrating device.

It is another object of my invention to provide a new and improved mechanical vibrating device whose frequency of vibration can be regulated.

It is another object of my invention to provide a new and improved mechanical vibrating device whose vibrator is disposed in a magnetic field and whose frequency of vibration can be regulated by varying the magnetic force gradient of the field parallel to the direction of vibration of the vibrator.

It is another object of my invention to provide a new and improved tuning fork whose frequency of vibration is regulated by the movement of a magnetic body relative to the tines of the fork.

It is another object of my invention to provide a new and improved tuning fork whose frequency of vibration is maintained substantially constant with change of temperature.

It is still another object of my invention to provide a new and improved tuning fork whose frequency of vibration is maintained substantially constant with change of temperature by varying the relative distance between the tines of the tuning fork and a regulating magnetic body in accordance with the changes in temperature.

It is still another object of my invention to provide a new and improved tuning fork whose amplitude of vibration is maintained constant with change of temperature.

Briefly stated, my new and improved mechanical vibrating device comprises a mechanical vibrator such as a tuning fork having electromagnetic driving means and electromagnetic pick-up means. The driving and pick-up means each comprise a permanent magnet and a coil wound about the magnet. The tuning fork is disposed in the magnetic fields of the magnets and its frequency of vibration is influenced by the magnetic force gradients of the magnetic fields parallel to the direction of vibration of the tines of the fork. In order to adjust the frequency of vibration of the tuning fork after it has been disposed in the magnetic fields, I provide a calibrating magnet which is mounted for movement to and away from the tuning fork and the magnets of the driving and pick-up means, the magnetic field of the calibrating magnet weakening the magnetic force gradients by which the frequency of the tuning fork is affected as the calibrating magnet approaches the tuning fork and the magnets of the driving and pick-up means. If desired, the calibrating magnet may be replaced by an appropriately shaped piece of magnetic substance which will act as a magnetic shunt to shunt some of the magnetic flux of the magnets of the driving and pick-up means from the tuning fork and thus weaken the magnetic force gradients by which the frequency vibration of the tuning fork is affected. In a modified form of my invention, a magnetic shunt or a magnet is mounted on a bimetallic strip which moves the shunt or magnet away from the tuning fork and the magnets of the driving and pick-up means with change of temperature in one direction and moves the shunt or magnet in the reverse direction with change of temperature in the other direction to compensate for the factors which vary with temperature and maintain the frequency of vibration of the fork constant.

For a better understanding of my invention reference may be had to the accompanying drawing and its scope will be pointed out in the appended claims.

Figure 1:
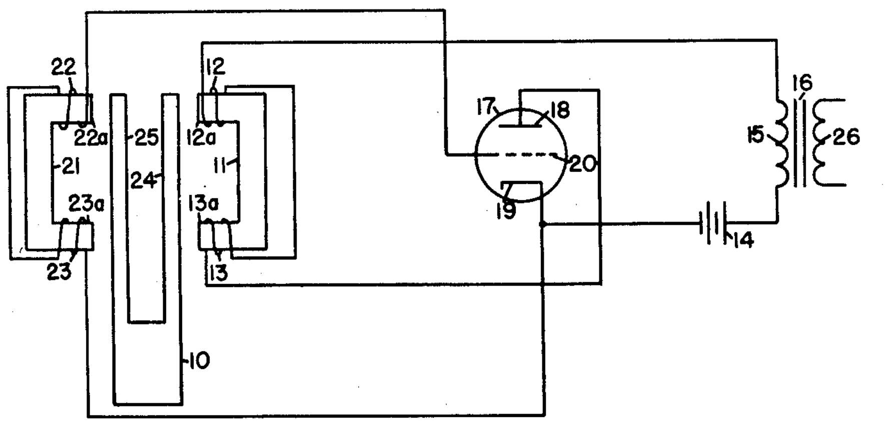
Figure 1 illustrates diagrammatically a conventional tuning fork and its associated driving and pick-up means.
Figure 6:
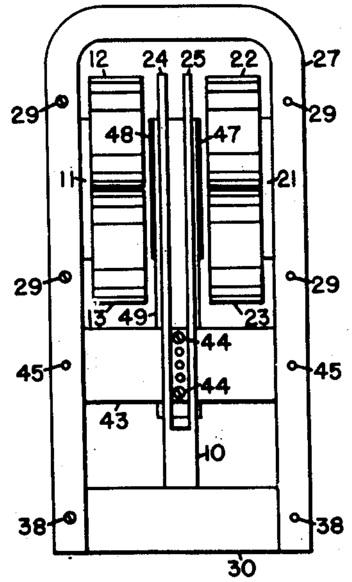
Figure 5:
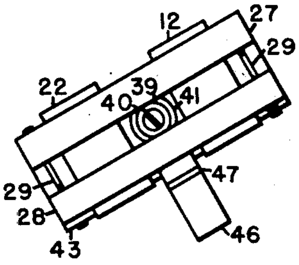
Figure 5 is a top plan view of the embodiment of my invention shown in Figure 2; and, Figure 6 is a front plan view of a modified form of the embodiment of my invention illustrated in Figures 1, 2, 3, and 4.

Referring now to Figure 1, the tuning fork 10 driving means comprises a core 11 which is a permanent magnet and serially connected driving coils 12 and 13 disposed on opposite pole pieces 12$a$ and 13$a$ of core 11 and energized from any suitable source of current, such as battery 14, through the primary winding 15 of an output transformer 16 and the anode-cathode circuit of an electric discharge means 17. The electric discharge means 17 is provided with an anode 18, a cathode 19 and a control grid 20, and may be of any of the several types well known in the art although I prefer to employ an electric discharge means of the high vacuum type.

The pick-up means comprises a core 21 which may be a permanent magnet, and serially connected pick-up coils 22 and 23 disposed on opposite pole pieces 22$a$ and 23$a$ of core 21 connected across control grid 20 and cathode 19 of electric discharge means 17.

The mode of operation of the tuning fork illustrated in Figure 1 will be well understood by those skilled in the art. Briefly, at the point in the cycle of vibration of tines 24 and 25 at which they are at their extreme outward displacement the velocity of tines 24 and 25 is zero and no voltage is being induced in pick-up coils 22 and 23. The attraction of the magnet 11 for the tine 24 is substantially the same as when tine 24 is at rest. Since tines 24 and 25 are now displaced from their normal rest positions, the elastic forces of tines 24 and 25 now accelerate them inwardly. The resulting movement of tines 24 and 25 causes a voltage to be induced in pick-up coils 22 and 23 proportional to the velocity of tines 24 and 25 and of such polarity that a negative potential is impressed on control grid 20 of electric discharge means 17. Electric discharge means 17 therefore transmits less current to driving coils 12 and 13 decreasing the attraction of magnet 11 for tine 24. The negative potential impressed on control grid 20 is of maximum value as tines 24 and 25 pass their normal rest positions and decreases to zero when tines 24 and 25 reach their extreme inward displacement. At this point the elastic forces of tines 24 and 25 accelerate them outwardly, the resulting movement inducing a voltage in pick-up coils 22 and 23 which is again proportional to the velocity of tines 24 and 25 but is of such polarity that a positive potential is impressed on control grid 20 causing electric discharge means 17 to transmit more current to driving coils 12 and 13 and causing driving coils 12 and 13 to exert a greater attraction on tine 24. This positive potential impressed on control grid 20 is of maximum value as tines 24 and 25 pass their normal rest positions and decreases to zero when tines 24 and 25 reach their maximum outward displacement. At this point the cycle repeats. As a result of the cyclic process described above the pulsations of current transmitted to driving coils 12 and 13 will cause pulsations in the attraction of magnet 11 for tine 24 which will cause sustained vibration of tuning fork 10 if power dissipated by tuning fork 10 is equal to or less than the power delivered to it by driving coils 12 and 13.

It is found that tuning fork 10 vibrates at a higher frequency when it is placed at a position where it is free of magnetic fields than when it is placed between cores 11 and 21.

Figure 4:
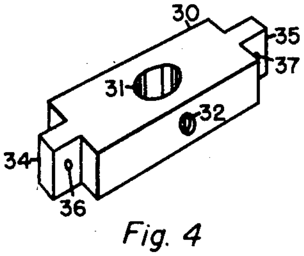
Figure 4 is a perspective view of a modified form of the device illustrated in Figure 2.
Figure 3:
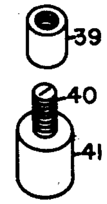
Figure 3 is an enlarged exploded view of a component of the device illustrated in Figure 2.
Figure 2:
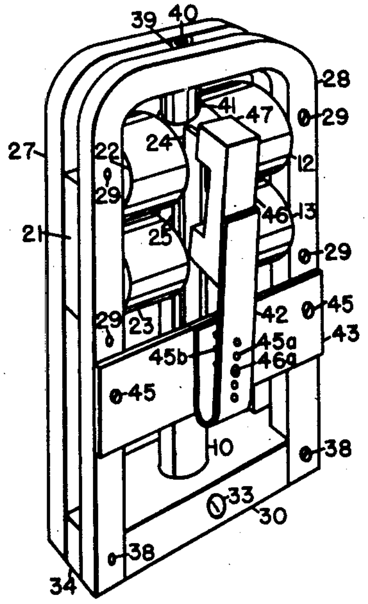
Figure 2 is a perspective view of a preferred embodiment of my invention.

In the preferred embodiment of my invention illustrated in Figures 2 to 4, the cores 11 and 21 are mounted between a pair of U-shaped frame members 27 and 28 by means of screws 29 which pull from members 27 and 28 toward each other and firmly hold cores 11 and 21 in their proper positions. Tuning fork 10 is mounted in position between cores 11 and 21 by a support member 30 which is provided with an aperture 31 in which the base portion of fork 10 is held rigidly. The dimensions of aperture 30 and fork 10 are chosen to ensure a close fit of fork 10 in aperture 31. Support member 30 is also provided with a topped aperture 32 which communicates with aperture 31 and through which a screw 33 passes to engage the base portion of fork 10 and hold it rigidly in support member 30. If desired, fork 10 may be further ensured against movement of its base relative to support member 30 by soldering the base of tuning fork 10 in aperture 30.

Support member 30 is also provided with reduced end portions 34 and 35 which are provided with transverse apertures 36 and 37 and which fit between frame members 27 and 28. Support member 30 is secured to frame members by any suitable means, such as screws 38 which pass through apertures 36 and 37 and engage in tapped apertures in frame members 27 and 28. Frame members 27 and 28 and support member 30 are of non-magnetic material such as brass, while fork 10 is of an elastic magnetic material. Cores 11 and 21 are high strength permanent magnets.

In order to allow the frequency of vibration of tuning fork 10 to be calibrated when it is firmly secured in its operating position between cores 11 and 21, I provide an internally threaded sleeve 39 which is secured to and between frame members 27 and 28 at a point intermediate cores 11 and 21 and directly above tuning fork 10. Sleeve 39 may be secured to frame members 27 and 28 by brazing, welding, or any other suitable means. A finely threaded screw 40 engages in sleeve 39 and moves a rod shaped calibrating member 41, which is secured to screw 40, toward and away from cores 11 and 21 as screw 40 is turned in sleeve 39.

If the calibrating member 41 is a permanent magnet, the polarities of the lower end of calibrating member 41 and the upper pole pieces 12$a$ and 22$a$ may be the same. For example, all may be south poles or all may be north poles. As a result, when screw 40 is turned to lower calibrating member 41 toward cores 11 and 21 and toward the tines 24 and 25 of the tuning fork 10, the magnetic force gradients in the direction parallel to the direction of vibration of tines 24 and 25 in which tines 24 and 25 are disposed is decreased and the frequency of vibration of tines 24 and 25 increases. By turning screw 40, therefore, the frequency of vibration of tuning fork 10 can be calibrated to a predetermined value at a certain temperature while fork 10 is mounted between cores 11 and 21.

The polarity of the lower end of calibrating member 41 when it is a permanent magnet may be opposite the polarities of the upper legs of cores 11 and 21 if it be so desired but the effect of movement of the magnet 41 will be less than if the polarities are the same. If calibrating member 41 is of magnetic material of low retentivity, such as soft iron or steel, instead of being a permanent magnet with relatively large magnetization, it then acts as a magnetic shunt and again varies the magnetic force gradients as its distance from cores 11 and 21 is varied. When calibrating member 41 acts only as a magnetic shunt, the effect of movement of calibrating member 41 is quite small.

Tuning fork 10 will vibrate at the calibrated standard frequency of vibration of tuning fork 10 only if the temperature of tuning fork 10, cores 21 and 22, and the mounting means for both tuning fork 10 and cores 21 and 22 does not vary from the temperature at which tuning fork 10 was calibrated. As the temperature departs from the value at which tuning fork 10 was calibrated, the frequency of vibration of tuning fork 10 may either increase or decrease depending on the characteristics of the metal of which tuning fork 10 is made. The effect of an increase in temperature on cores 11 and 21 is always the same. The magnetic strength of the magnetic fields of cores 11 and 21 decreases. When the temperature decreases, the strength of the magnetic fields of cores 11 and 21 increases. This property of cores 11 and 21 does not change unless the cores 11 and 21 are subjected to excessively high temperatures which will not occur under normal operating conditions. The change in the frequency of vibration due to the changes in the dimensions of tines 24 and 25 and in the modulus of elasticity of the material of fork 10 due to departure from the temperature at which fork 10 was calibrated is relatively much greater than the change in frequency due to the change in the strength of the magnetic fields of cores 11 and 21 due to the change in temperature.

In order to compensate for the changes in the frequency of vibration of fork 10 due to changes in temperature, I provide a bimetallic element 42 having one end rigidly secured to a strip 43 by means of screws 44 or by any other suitable means. Strip 43 is secured to frame member 23 by means of screws 45. The free end of bimetallic strip 42 moves toward and away from tuning fork 10 in a plane intermediate cores 11 and 21 with changes in temperature since the two elements constituting the bimetallic strip 42 have different coefficients of expansion. A compensating member 46, which may be a permanent magnet, is rigidly secured to the free end of bimetallic strip 42 and varies the magnetic force gradients parallel to the direction of vibration of tines 24 and 25 in accordance with the variations of the temperature to keep the frequency of vibration of tuning fork 10 substantially constant.

If the physical properties of the elastic material of which tuning fork 10 is made are such that the frequency of vibration of tuning fork 10 tends to increase with rise in temperature, bimetallic strip 42 is positioned to move compensating member 46 away from tuning fork 10 as the temperature increases so that the magnetic force gradients of the magnetic fields of cores 11 and 21 parallel to the direction of vibration of tines 24 and 25 are increase tending to decrease the frequency of vibration. If the temperature decreases, strip 42 moves compensating member 46 toward tuning fork 10. The degree of compensation may be adjusted either by bending bimetallic strip 42, by changing the vertical position of compensating member 46 with respect to the tuning fork 10, or by changing the length of bimetallic strip 42. The first two methods change the basic frequency of vibration of fork 10 as well as the degree of compensation while the latter method changes only the degree of compensation. In order to provide a readily adjustable means for changing the degree of compensation, I provide a plurality of threaded and paired apertures 45*a* and 45*b* in bimetallic strip 42. A screw 46*a* is engaged in a pair of apertures 45*a* and 45*b*. By turning screw 46*a*, the bimetallic strip 42 may be bent toward or away from tines 24 and 25. The screw 46*a* may also be moved from one pair of apertures 45*a* and 45*b* to another to vary the effective length of strip 42. The degree of compensation may therefore be easily adjusted by means of screw 46*a*.

If the physical properties of the elastic material of which tuning fork is made are such that the frequency of vibration of tuning fork 10 tends to increase with rise in temperature, bimetallic strip 42 is positioned to move compensating member 46 toward fork 10 as the temperature increases and away from fork 10 when the temperature decreases. The compensating member 46 is a permanent member of such polarity that its opposite end portion has the same polarity as the upper pole pieces 12*a* and 22*a* of cores 11 and 21, respectively. The polarity of the compensating member 46 could be reversed if desired but the degree of compensation for a given movement of member 46 would be decreased.

Instead of employing a permanent magnet compensating member 46, compensating members 47 and 48 of magnetic material of low magnetic retentivity may be employed. Compensating members 47 and 48 are mounted on a bimetallic strip 49, which moves compensating members 47 and 48 relative to pole pieces 22*a* and 23*a*, and 12*a* and 13*a*, respectively, to vary the magnetic force gradients parallel to the direction of vibration of tines 24 and 25 to maintain the frequency of vibration constant. Compensating members 47 and 48 vary the frequency of vibration of tines 24 and 25 by diverting a portion of the magnetic flux away from tines 24 and 25, the magnetic force gradients parallel to the direction of vibration of tines 24 and 25 varying with the strength of the magnetic fields in which tines 24 and 25 are disposed. The closer compensating members 47 and 48 lie adjacent pole pieces 22*a* and 23*a*, and 12*a* and 13*a*, the more flux is diverted and the greater is the change in the magnetic force gradients. The principle of operation of compensating members 47 and 48 being similar to that of compensating member 46, a more detailed description of the mode of operation of compensating members 47 and 48 is believed unnecessary. While two compensating members 47 and 48 are employed to obtain greater symmetry in the forces exerted on tines 25 and 24, it is possible to employ only one compensating member 47 or 48 if it be so desired.

Compensating members 47 and 48 vary the magnetic fields in which tines 24 and 25 are disposed and therefore also vary the amplitude of vibration of tines 24 and 25. In some applications where constant amplitude of vibration as well as constant frequency of vibration are desired, it is possible to employ compensating members 47 and 48 to compensate for variation in amplitude and a compensating member 46 to compensate for variations in frequency. Both frequency and amplitude of vibration of a tuning fork driven by electromagnetic means tend to vary with temperature. The variation in amplitude is caused mainly by the change in permeability of the tines 24 and 25 of the tuning fork 10 caused by variations in the temperature of the tuning fork.

It will be apparent to those skilled in the art that the above described permanent magnet means for calibrating and regulating the frequency of vibration of a tuning fork may be employed even though driving means of non-electromagnetic type are employed. Movement of a permanent magnet relative to the tines of a tuning fork will vary the frequency of vibration of the fork even if the fork is not disposed in other magnetic fields, the frequency decreasing as the permanent magnet is moved closer to the tines. In this case the effect of the permanent magnet on the frequency is opposite to the effect where electromagnetic driving means are employed.

While I have shown and described preferred embodiments of my invention, it will be obvious to those skilled in the art that various changes and modifications can be made without departing from the spirit and scope of my invention and I, therefore, aim in the appended claims to cover all such changes and modifications as fall within the true spirit and scope of my invention.

What I claim as new and desire to secure by Letters Patent of the United States is:

1. A mechanical vibrating device comprising: a frame structure; electromagnetic driving means and electromagnetic pick-up means rigidly supported by said frame structure, said driving and pick-up means producing magnetic fields; a vibrator of magnetic material disposed between said driving and pick-up means in said magnetic fields and maintained in position by such frame structure, said driving means maintaining said vibrator in vibration, said vibrator inducing a voltage in said pick-up means when in vibration; calibrating means supported by said frame structure, said means comprising a first body of magnetic material disposed adjacent said vibrator and said driving and pick-up means, and means for varying the distance of said body from said vibrator and said driving and pick-up means for varying the magnetic force gradient of said magnetic fields parallel to the direction of vibration of said vibrator to vary the frequency of vibration of said vibrator; and means for maintaining the frequency of vibration of said vibrator substantially constant with change in temperature, said last mentioned means comprising a bimetallic strip having one end rigidly secured to said frame support and having a free end whose distance from said vibrator and said driving and pick-up means varies in accordance with temperature, and a second body of magnetic material rigidly secured to said free end of said bimetallic strip for varying the magnetic force gradient of said magnetic fields parallel to the direction of vibration of said vibrator in accordance with the temperature of said vibrator.

2. The mechanical vibrating device of claim 1, in which said first and second bodies of magnetic material are permanent magnets.

3. The mechanical vibrating device of claim 2 in which said electromagnetic driving means and said electromagnetic pick-up means each comprise a permanent magnet.

4. The mechanical vibrating device of claim 1 in which said electromagnetic driving means and said electromagnetic pick-up means each comprise a permanent magnet.

5. A mechanical vibrator device comprising: a vibrator of magnetic material; electromagnetic driving means adjacent said vibrator for maintaining said vibrator in vibration, said driving means producing the magnetic field in which said vibrator is disposed; and means for maintaining the frequency of vibration of said vibrator substantially constant with change in temperature, said last mentioned means comprising a body of magnetic material and means for moving said body relative to said driving means in accordance with the temperature, said body varying the magnetic force gradient of said magnet field parallel to the direction of vibration of said vibrator in which said vibrator is disposed, said means for moving said body comprising a bimetallic strip having an immovable end secured at a fixed distance from said vibrator and said driving means and a movable end whose distance from said vibrator and said driving means varies in accordance with temperature, said body being secured to said bimetallic strip adjacent said movable end, said body of magnetic material being a permanent magnet.

JOSEPH J. MURRAY, Jr.

REFERENCES CITED

The following references are of record in the file of this patent:

UNITED STATES PATENTS

| Number | Name | Date |
|---|---|---|
| 382,195 | Selden | May 1, 1888 |
| 1,328,825 | Drysdale | Jan. 27, 1920 |
| 1,521,766 | Harris | Jan. 6, 1925 |
| 1,653,794 | Whitehorn | Dec. 27, 1927 |
| 1,784,844 | Marrison | Dec. 16, 1930 |
| 2,147,492 | Mead | Feb. 14, 1939 |
| 2,442,016 | Poole | May 25, 1948 |
| 2,547,026 | Winkler | Apr. 3, 1951 |

FOREIGN PATENTS

| Number | Country | Date |
|---|---|---|
| 237,334 | Great Britain | July 22, 1925 |